United States Patent [19]

AuYoung

[11] 4,186,566
[45] Feb. 5, 1980

[54] MODIFIED WIRE MESH CONVEYOR BELT FOR AIR FLUIDIZATION TYPE FOOD FREEZERS

[75] Inventor: David K. Y. AuYoung, Vancouver, Canada

[73] Assignee: Lewis Refrigeration Co., Redmond, Wash.

[21] Appl. No.: 899,555

[22] Filed: Apr. 24, 1978

[51] Int. Cl.² ............................................. F25D 25/04
[52] U.S. Cl. ........................................ 62/380; 62/57;
34/57 A; 198/848; 198/851; 432/121
[58] Field of Search .................... 198/848, 851; 62/57,
62/63, 266, 374, 375, 380; 432/121; 34/57

[56] References Cited
U.S. PATENT DOCUMENTS

| | | |
|---|---|---|
| 3,154,459 | 10/1964 | Cranston ............................. 198/848 |
| 3,226,947 | 1/1966 | Wakatsuki et al. .................... 62/380 |
| 3,300,030 | 1/1967 | Scherfel ............................. 198/848 |
| 3,920,117 | 11/1975 | Roinestad ............................ 198/848 |
| 3,982,404 | 9/1976 | Overbye ................................. 62/57 |

*Primary Examiner*—Ronald C. Capossela
*Attorney, Agent, or Firm*—Christensen, O'Connor, Johnson & Kindness

[57] ABSTRACT

Non-uniformity of air fluidization freezing of food particles on a wire mesh conveyor belt caused by variations in food particle layer thickness or in layer permeability over the working area of the belt is minimized by the presence of uniformly spaced airflow masking rods placed in the transversely extending core spaces of the belt helices. Of selected material, such as polyethylene, the rods serve also to strengthen and stiffen the belt and to minimize uneven wear in the mesh.

5 Claims, 6 Drawing Figures

MODIFIED WIRE MESH CONVEYOR BELT FOR AIR FLUIDIZATION TYPE FOOD FREEZERS

BACKGROUND OF THE INVENTION

This invention relates to improvements in IQF (individual quick freeze) freezers and more particularly to improvements in conveyor belts used in such freezers for the freezing of food such as peas, cut corn, berries, etc. The invention is herein illustratively described by reference to the presently preferred embodiment thereof; however, it will be recognized that certain modifications and changes with respect to details may be made without departing from the essential features involved.

Wire mesh type conveyor belts composed of successively linked transverse wire helices are commonly employed in food freezers as a means to support the food particles in transit through the freezer while permitting air fluidization of the particles during the process. The mesh openings are sufficiently small to support articles like shelled peas and, given the strength of stainless steel and certain other metals, the wire diameter can be small so as to present a low resistance to upward flow of fluidizing freezing air through the belt and through the food particles spread over the surface area of the belt. Persons working in this art and designing such systems heretofore have consistently specified belts of this type. The theory was that airflow resistance through the mesh should be as small as possible compatible with particle support and belt strength requirements so as to maximize the effectiveness of airflow in fluidizing and quickly freezing the mass.

In accordance with this invention, however, it has been discovered that the previously desired low resistance to flow of air through such belts is detrimental to the overall process, particularly the economics thereof in commercial installations. With the uniformly low airflow resistivity of the belt mesh itself, inevitable variations in depth or permeability of the mass of particles over the area of the belt cause material differences in the volumetric airflow through regions of the massed particles over the area of the belt and thereby cause material differences in the freezing and fluidizing effects achieved. In consequence, in order to assure proper freezing of all particles, it is necessary to limit the speed of travel of the conveyor through the freezer to meet the requirements of the particle mass where it is thickest or least readily penetrated by the airflow. This not only slows down production, but it also has a tendency to vary product uniformity from the standpoint of IQF specifications, including uniformity of surface glaze and uniformity of temperature gradients achieved within the individual food particles.

In accordance with an object of this invention, the advantages of wire mesh conveyor belts, of conventional construction or otherwise, either in existing systems or in newly constructed systems, may still be employed, but without the limitations mentioned above.

A further object of this invention is to devise a means to improve the production rate capability and the uniformity of processing capability of food particle IQF freezers using wire mesh type conveyor belts. A related object is to achieve these results in a manner also improving the mechanical and wear characteristics of the conveyor belt.

A further advantage of the invention lies in its relatively simple and inexpensive implementation both in existing and in new freezer mesh type conveyor belts.

BRIEF DESCRIPTION OF THE INVENTION

In accordance with this invention, the open mesh area and thereby the flowthrough admittance of a wire mesh type conveyor belt used in IQF food freezers and the like is materially reduced by inserting rods of polyethylene or other suitable material transversely through the aligned convolutions of the successively interconnected helices forming the belt mesh. With the flowthrough resistivity of the belt itself thus greatly increased by this masking effect, variations in flow resistivity caused by variations in thickness or flow-through permeability of the deposited layer of food particles on the belt become relatively minor or inconsequential. Accordingly, in a commercial freezer wherein maximum sustained processing rates are essential, this invention making novel use of masking rods in the belt mesh improves the uniformity of fluidization freezing over the belt area despite product distribution non-uniformities and permeability and thereby permits increasing conveyor speed through the freezer. While the system modification requires raising the level of air pressure difference to produce the necessary volumetric flow rates through the belt and mass of food particles thereon, this is easily and economically achieved simply by operating the existing blowers at higher output pressures.

Furthermore, as a secondary benefit the rods extending transversely through the belt's helices and at regular intervals throughout its length lend stiffness and strength to the belt against sagging and against uneven stretching or racking in its own plane when under load. Aiding in distributing load more evenly, such masking rods also thereby contribute to increased useful life of the belt by minimizing uneven wear contact pressures in the belt mesh.

These and other features will be evident as the description proceeds with reference to the preferred embodiment.

DETAILED DESCRIPTION REFERRING TO THE DRAWINGS

Figure 1:
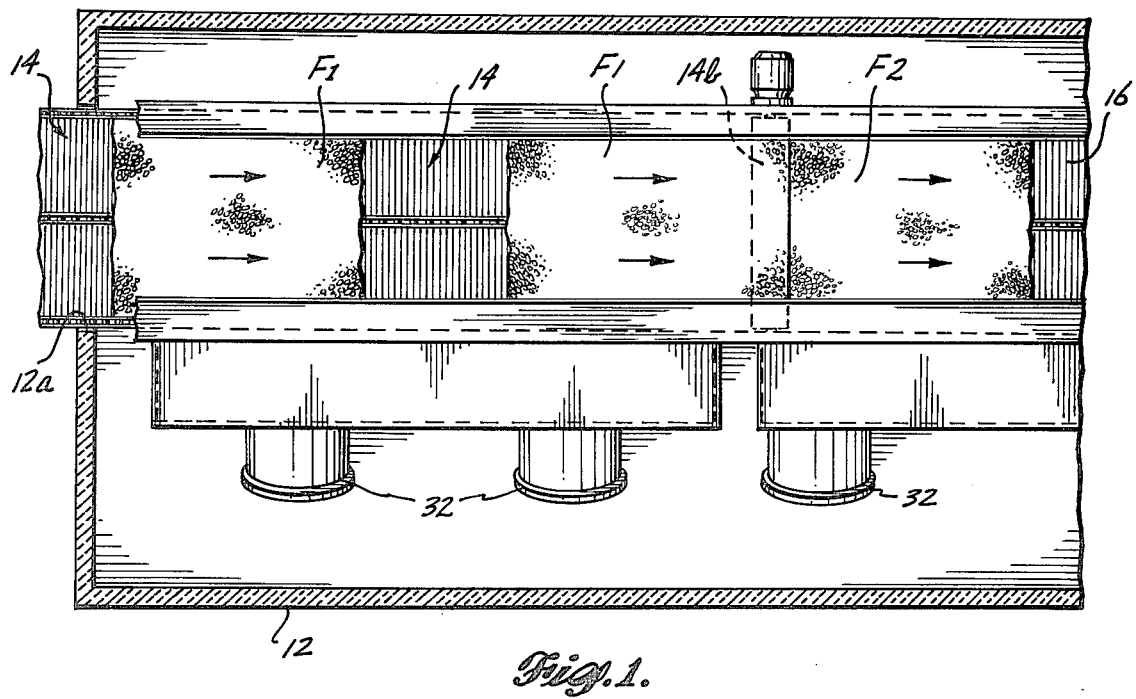
FIG. 1 is a plan view and FIG. 2 a side view of a commercial IQF food freezer of a type suitable for application of the invention, parts thereof being removed for purposes of illustration.
Figure 2:
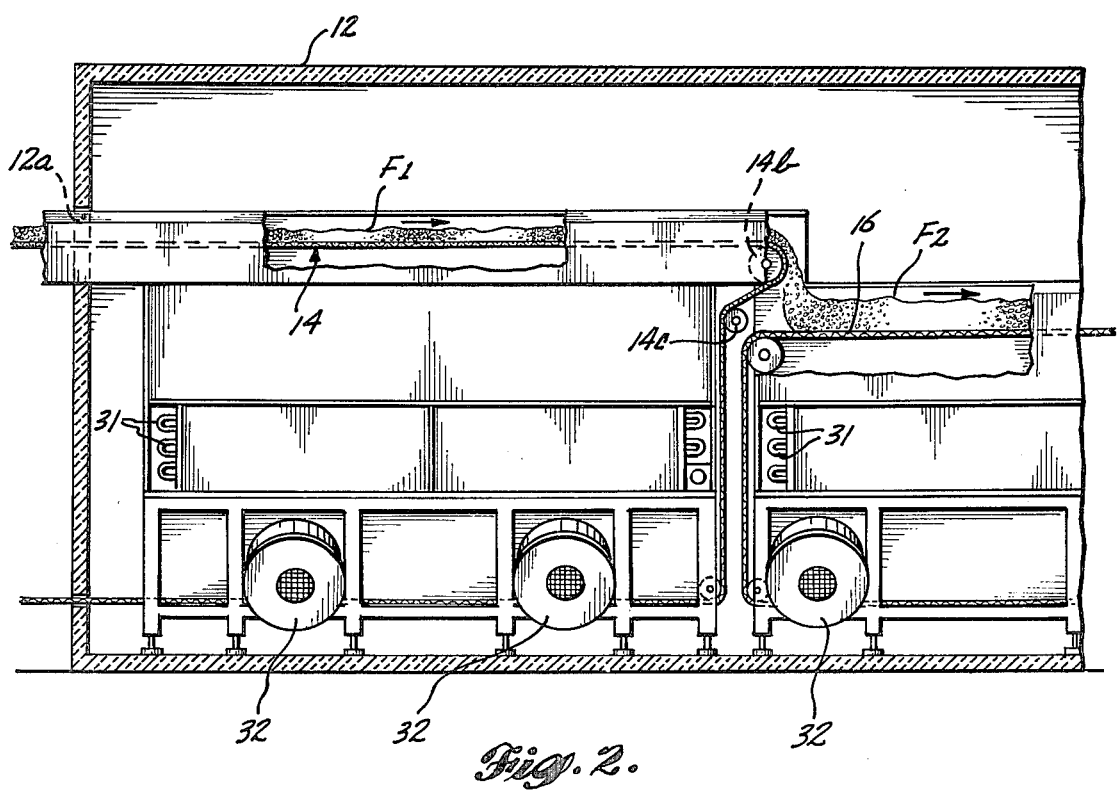

Referring to FIGS. 1 and 2, food particles to be frozen are deposited in a layer $F_1$ on an input conveyor 14 that enters the freezer housing 12 through end wall opening 12a. The input conveyor 14 comprises an endless wire mesh belt to be described that passes around an end guide roller 146 and an inset roller 14 that creates an overhang above an output conveyor 16. The latter also comprises an endless wire mesh belt to be described that carries the mass of particles $F_2$ to a discharge location (not shown). The preferred freezer system incorporating these successive conveyors and the operation thereof is described in U.S. Pat. No. 3,982,404, as one application of the present invention. Reference is hereby made to said patent for further details of the preferred system. Blowers 32 create positive air pressure in the plenum spaces beneath the food-supporting, substantially horizontal upper stretches of the conveyor belts to create an upward flow of fluidizing, freezing air through the belts into the plenum space immediately overlying the same preliminary to such air being drawn back to the blowers. The circulating air passes through freezer coils in this process so as to freeze the particles while in a fluidized state on the belts.

Figure 3:
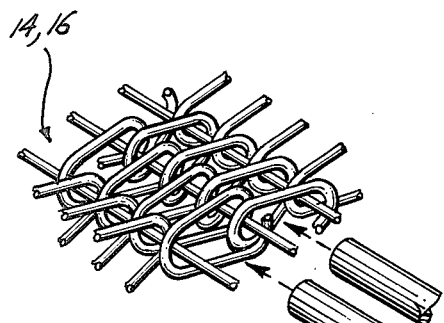
FIGS. 3, 4 and 5 are, respectively, a fragmentary isometric view, an enlarged fragmentary sectional side elevation view and a corresponding top view of one conventional type of conveyor belt modified according to the invention.
Figure 4:
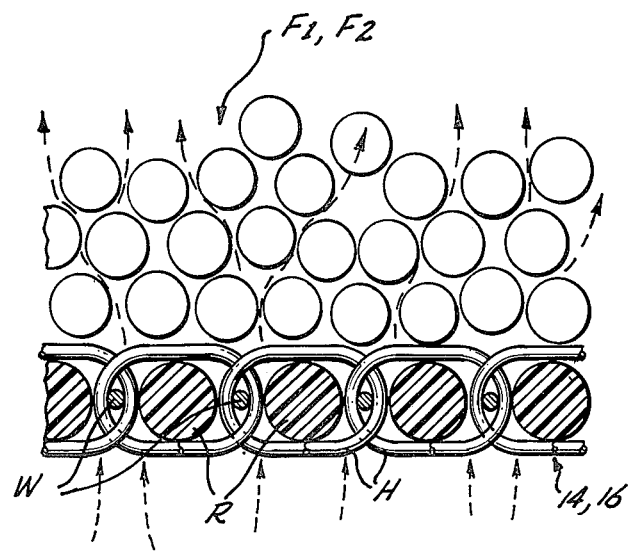
Figure 5:
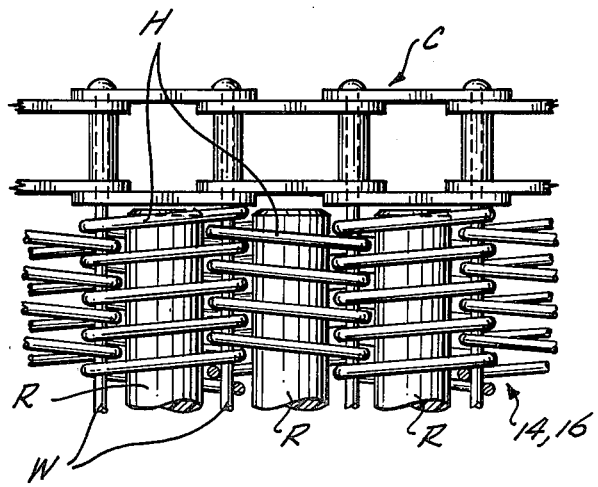

As shown in FIGS. 3-5, the wire mesh conveyor belts 14, 16 modified pursuant to this invention, incorporate transversely extending masking rods R of polyethylene or equivalent material. Preferably of round cross section, these rods are received in the core spaces extending widthwise of the belt through each of the successively interconnected helices H forming the belt mesh. In this particular form of belt, the belt helices are of alternately opposite pitch and are interconnected by transverse coupler rods W commonly linked to the turns of the mutually adjacent helices. (Note that the helices are usually not round, but oblong in section as shown). This belt configuration is sometimes referred to as a balanced weave. In this belt the rods W connect to chains C at the longitudinal edges and one or more intermediate locations across the belt. The plastic rods R, of a diameter equal to a major fraction of the helix width or "diameter" in the belt plane, thus materially obstruct or mask the belt to flow of air upwardly through the belt to such an extent that the total resistivity to upward airflow through the belt and mass of food particles deposited thereon is greatly increased over that in a conventional freezer belt system. Accordingly, the contribution to variability of such airflow caused by variations in layer thickness or flow permeability of the massed particles themselves over different areas of the belt is thereby minimized. Compensation for this increased resistivity to airflow is readily achieved by operating the blowers 32 so as to create a higher lower plenum chamber pressure and thereby still achieve the volumetric flow rate of air through the mass of food particles required for effective fluidization and quick freezing of the individual particles.

Figure 6:
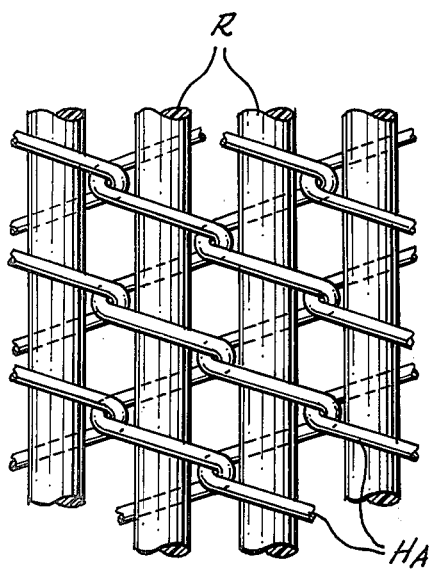
FIG. 6 is a fragmentary top view of a second conventional type of wire mesh conveyor belt modified pursuant to the invention.

In the belt embodiment of FIG. 6 a conventional weave belt is illustrated wherein the turns of the successive belt helices $H_A$ are linked together directly. The plastic rods R extend transversely of the belt through the helix core spaces as in the preceding embodiment and with the same effect. Still other forms of wire mesh belt may also be employed in practicing this invention.

As previously indicated, it is desired that the transverse helix core rods substantially fill the helix interiors to the extent there is clearance for these rods, and further as a matter of convenience it is preferred that the rods be of circular cross section. In this way they are free to revolve within their helical cages and thereby to present changing surfaces to the wire elements in response to forces tending to move them during belt operation. In a typical food freezer application, for example, using the double balanced weave type belting shown in FIGS. 3-5, polyethylene rods 5/16" in diameter are used in the belting. The belt helix pitch distance is approximately 5/32", the minor helix turn diameter (or width) is about 7/16" and the major diameter is about $\frac{5}{8}$". The wire diameter itself is 3/64" in this example.

However these dimensions and dimensional relationships are merely illustrative and are not critical. What is important is that the masking rods materially increase the resistivity of the belt to airflow and thereby materially reduce the effect of food particle load variations over the area of the belt on uniformity of processing of the food particles in all areas.

Inasmuch as the masking rods of solid material virtually fill the helix spaces so as to create maximum masking effect, in order to pass through the belt, air is required to flow through the remaining open spaces in the belt where the wire components link the parts of the belt together. At the same time this is accomplished, the rods serve the incidental function of stiffening and strengthening the belt between its drive chains C at opposite sides and/or transversely intermediate locations along the belt. Moreover, by tending to prevent uneven stretching of the belt under load in its loaded stretch body plane, these rods also tend to minimize extreme belt wire-to-wire contact pressure variations and thus minimize belt wear.

These and other advantages of the invention and its varying embodiment possibilities are believed to be evident to those skilled in the art referring to this disclosure of the preferred embodiment.

The invention in which an exclusive property or privilege is claimed is as follows:

1. In apparatus for IQF freezing of food particles and the like massed in air-fluidized state on a moving conveyor belt, the combination comprising elongated flexible endless wire mesh conveyor belt means having a substantially horizontal belt stretch upon which the particles are deposited to a depth subject to variation of thickness or permeability to airflow over the area of said belt stretch for conveyance of the particles through the apparatus, enclosure means associated with said belt stretch and forming compartment spaces respectively above and below said belt stretch and associated air pressurization and freezer apparatus operable to create a pressure difference of air in said compartments that causes forceable upward flow of freezing air through the open mesh of said belt stretch and the mass of particles thereon over the area of said stretch at sufficiently depressed temperature and with sufficient flow velocity substantially to fluidize and freeze the mass of particles while in transit through the apparatus; the combination of a wire mesh conveyor belt means comprising a series of elongated substantially helical wire links individually disposed transversely to the length of the belt stretch in the plane thereof and successively interconnected, and a plurality of elongated rod elements inserted lengthwise through the successive helical links across the width of the belt, said rod elements having a flow obstructing cross section that materially reduces the open flow area through the belt mesh and confines the upward flow through the belt to the mesh openings between rods totalling a minor fraction of the total belt area.

2. The combination defined in claim 1, wherein the rod elements are round in cross section.

3. The combination defined in claims 1 or 2, wherein the rods are of solid synthetic plastic material.

4. The combination defined in claims 1 or 2, wherein the rods are of polyethylene.

5. The combination defined in claims 1 or 2, wherein the rod elements have a cross section that substantially fills the open core areas of the respective wire helices in which they are respectively received.

* * * * *